United States Patent
Dick et al.

(10) Patent No.: US 7,376,544 B1
(45) Date of Patent: May 20, 2008

(54) VECTOR TRANSFER DURING CO-SIMULATION

(75) Inventors: Christopher H. Dick, San Jose, CA (US); Nabeel Shirazi, San Jose, CA (US); Roger B. Milne, Boulder, CO (US); Jeffrey D. Stroomer, Lafayette, CO (US); Jonathan B. Ballagh, Longmont, CO (US)

(73) Assignee: Xilinx, Inc., San Jose, CA (US)

( * ) Notice: Subject to any disclaimer, the term of this patent is extended or adjusted under 35 U.S.C. 154(b) by 732 days.

(21) Appl. No.: 10/777,419

(22) Filed: Feb. 12, 2004

(51) Int. Cl.
    *G06F 17/50* (2006.01)
(52) U.S. Cl. .................. 703/14; 716/4; 716/5
(58) Field of Classification Search .............. 703/13, 703/14; 716/5
    See application file for complete search history.

(56) References Cited

U.S. PATENT DOCUMENTS 6,389,379 B1 * 5/2002 Lin et al. ................. 703/14
6,968,514 B2 * 11/2005 Cooke et al. .............. 716/1

OTHER PUBLICATIONS

Tabbara et al. (Fast Hardware-Software Co-Simulation Using VHDL Models, Dec. 4, 1998).*
Seungjun Lee (A Hardware-Software co-Simulation Environment, PHD Thesis University of California, Berkeley 1993).*

* cited by examiner

*Primary Examiner*—Paul Rodriguez
*Assistant Examiner*—Andre Pierre-Louis
(74) *Attorney, Agent, or Firm*—LeRoy D. Maunu

(57) ABSTRACT

Various embodiments are disclosed for transferring data between blocks in a design during simulation. Operation of at least one high-level block in the design is simulated in a high-level modeling system (HLMS). A hardware-implemented block in the design is co-simulated on a hardware simulation platform. A first vector of data received by a co-simulation block is transferred to the simulated hardware-implemented block via a transfer function.

17 Claims, 5 Drawing Sheets

VECTOR TRANSFER DURING CO-SIMULATION

FIELD OF THE INVENTION

The present invention generally relates to co-simulation.

BACKGROUND

High-level modeling system (HLMS) environments allow assembly, simulation, debugging, and translation of electronic designs into hardware. Traditionally, a model that is implemented using an HLMS is simulated using software functions that mimic the hardware behavior of the components, or "blocks," that define the design. It is sometimes beneficial to use hardware, in combination with software, during a simulation. Hardware in the simulation loop may accelerate simulation speeds and enable real-time hardware verification of a design. In scenarios in which hardware is used, the HLMS has access to the software necessary to communicate and control an underlying hardware platform.

Some HLMS environments, for example, System Generator for DSP ("Sysgen") from Xilinx, provide a translation pathway from a high-level model down to FPGA hardware. The type of hardware Sysgen produces depends on user configurations. Under some configurations, System Generator can produce a special type of hardware that can be brought into the HLMS environment and co-simulated with other HLMS blocks. During simulation, a run-time co-simulation block controls the underlying hardware through function calls, to a hardware interface layer.

Although hardware co-simulations may appreciably increase simulation speed, the actual throughput achieved between software-simulated blocks and a hardware-simulated block may be limited by overhead involved in transferring data between the simulation software running on a host workstation and the FPGA hardware. Much of the available bandwidth of the physical connection (e.g., PCI, USB, Ethernet) between the host workstation and the FPGA may be wasted when single scalar values are transferred during a transaction. For example, in some environments a new transaction may be required between the hardware interface layer and the co-simulation block for each co-simulation event, such as forcing data to a port or examining a port for data. When the number of simulation events is high, and the amount of data being transferred during each event is low, these transactions can become costly in terms of overhead. The overhead associated with initiating a transaction may become a bottleneck in HLMS simulation, especially for simulations involving high-bandwidth data streams such as video and audio streams.

The present invention may address one or more of the above issues.

SUMMARY OF THE INVENTION

Various embodiments of the invention relate to transferring data between blocks in a design during simulation. Operation of at least one high-level block in the design is simulated in a high-level modeling system (HLMS), and a hardware-implemented block in the design is co-simulated on a hardware simulation platform. A vector of data received by a co-simulation block is transferred to the simulated hardware-implemented block via a single call to a first function provided by an interface. The interface couples the HLMS and the simulated hardware-implemented block, and the co-simulation block represents the simulated hardware-implemented block in the high-level modeling system.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

The various embodiments of the invention may be used to accelerate a simulation that involves co-simulating a hardware-implemented block while other high-level blocks are simulated in an HLMS. The simulation is accelerated by way of burst transfers of data between the HLMS and the hardware-implemented block. Burst transfer involves the transfer of vector data in a single HLMS operation. It will be appreciated that vector data is a group of two or more data values, whereas scalar data is a single data value. A vector of data or data values may also be referred to as a frame of data.

In one embodiment, scalar values may be accumulated (buffered) in the HLMS into a frame of data that is transferred to the hardware-implemented block. The HLMS may also de-buffer data received from the hardware-implemented block and provide scalar values to a downstream block in the HLMS.

The HLMS determines the sizes of buffers used to transfer frames of data from information in the design. The HLMS may also consider the amount of available hardware resources in determining buffer sizes.

Figure 1:
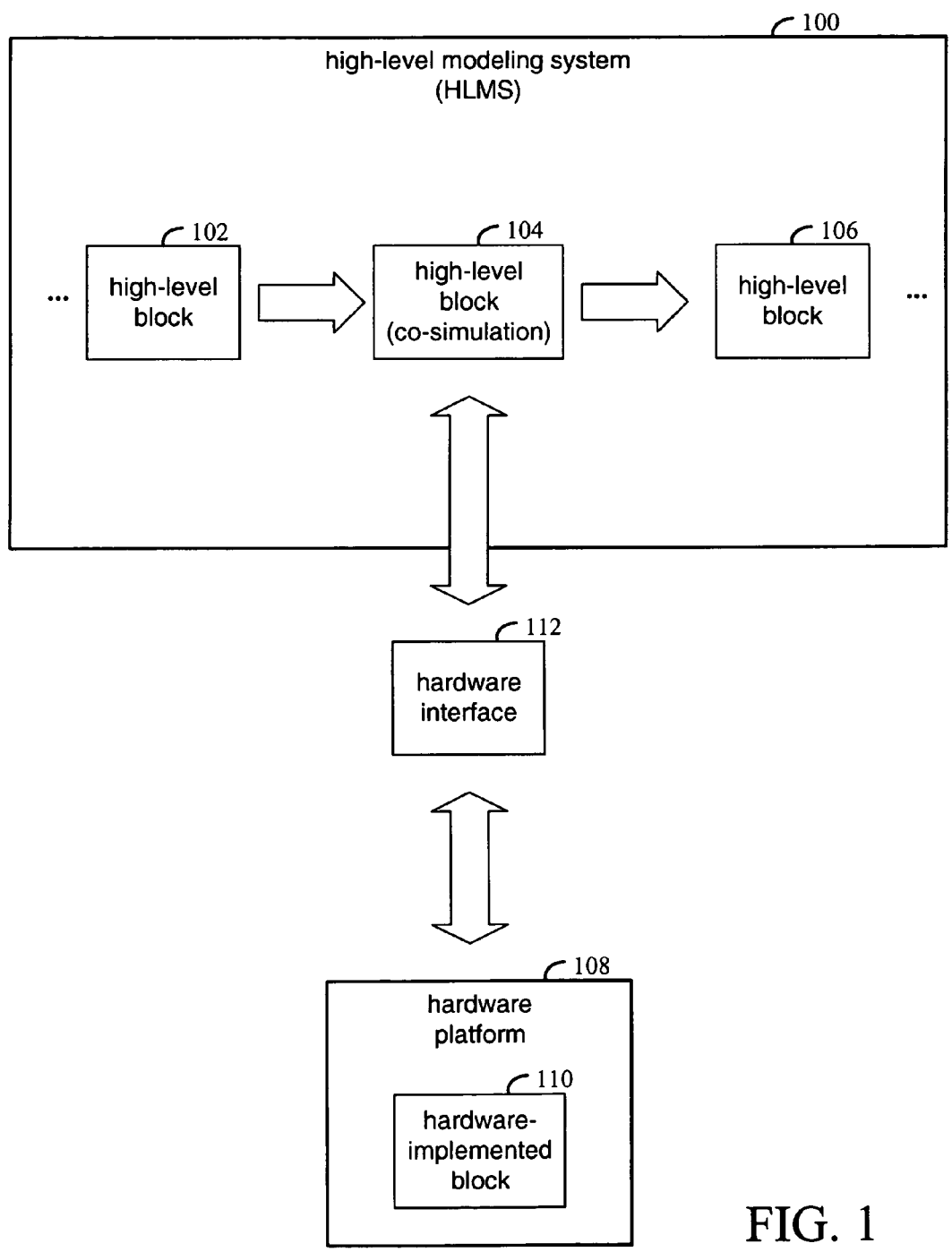
FIG. 1 is a block diagram that illustrates the data flow between components of a high-level design in a high-level modeling system and a hardware-implemented block of the design on a hardware platform.

FIG. 1 is a block diagram that illustrates the data flow between components of a high-level design in a high-level modeling system and a hardware-implemented block of the design on a hardware platform. Examples of the blocks in the design include high-level block 102, high-level block 104, and high-level block 106. The directional symbols between the blocks illustrate the flow of data. For example, block 102 provides data to co-simulation block 104, and co-simulation block 104 provides data to high-level block 106.

High-level blocks 102 and 106 represent subsystems of the design that may be simulated in software, and block 104 represents a subsystem that may be simulated in hardware, for example on hardware platform 108. High-level block 104 is also referenced herein as a "co-simulation" block since its functions are co-simulated in hardware. Hardware-implemented block 110 represents the hardware implementation of the subsystem represented by co-simulation block 104 in the HLMS 100.

The interface 112 connects the HLMS 100 to the hardware platform 108. That portion of interface 112 that communicates with the hardware platform will vary according to the implementation-specific characteristics of the hardware platform, and that portion of the interface that communicates with the HLMS 100 may be at a higher level and more abstract. For example, The Nallatech BenONE card is a hardware platform that interfaces to a host computer system via a (peripheral component interconnect) PCI bus or USB, and the WildCard type hardware platform from Annapolis Micro Systems interface to a laptop computer via a Personal Computer Memory Card International Association (PCM-CIA) style card slot. The interface 112 interacts with the HLMS at a higher level.

The function calls made by the HLMS 100 to the interface 100 are for performing tasks such as opening and closing the hardware platform, managing data input/output (I/O), and controlling the clock resources of the hardware platform. The interface 112 translates these high-level functions into function calls that are specific to the hardware platform.

Figure 2:
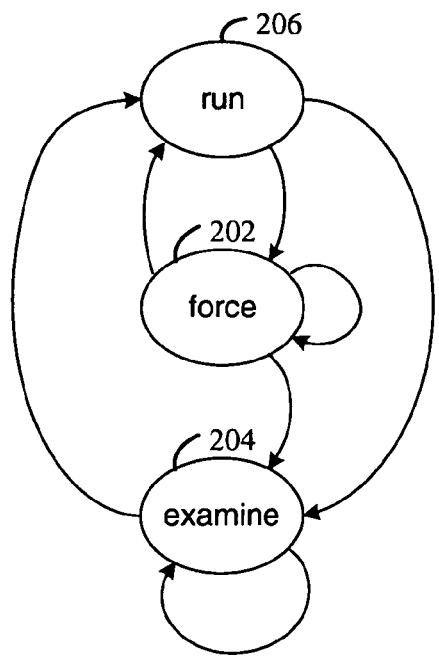
FIG. 2 illustrates the execution order of run, force, and examine functions during a simulation cycle.

FIG. 2 illustrates the execution order of run, force, and examine functions during a simulation cycle. During simulation, co-simulation block 104 behaves in a manner similar to high-level blocks 102 and 106. The co-simulation block 104 consumes and produces the same signal types as the high-level blocks 102 and 106. When data arrives at an input port (not shown) of the co-simulation block 104, the data is transferred to the interface with a force function 202, and the interface transfers the data to the hardware-implemented block 110 on the hardware platform 108. When the co-simulation block 104 needs to generate data on its output port (not shown), the co-simulation block invokes the examine function 204 of the interface 112, and the interface reads the data from the hardware-implemented block 110. The co-simulation block 104 remains in lock-step with the simulation environment by single-stepping the hardware-implemented block 110 via a run function 206 whenever the simulation time is advanced by the HLMS 100. After stepping the hardware platform 108 with the run function 206, the HLMS 100 may initiate the examine function 204 to gather output data from the hardware.

Figure 3:
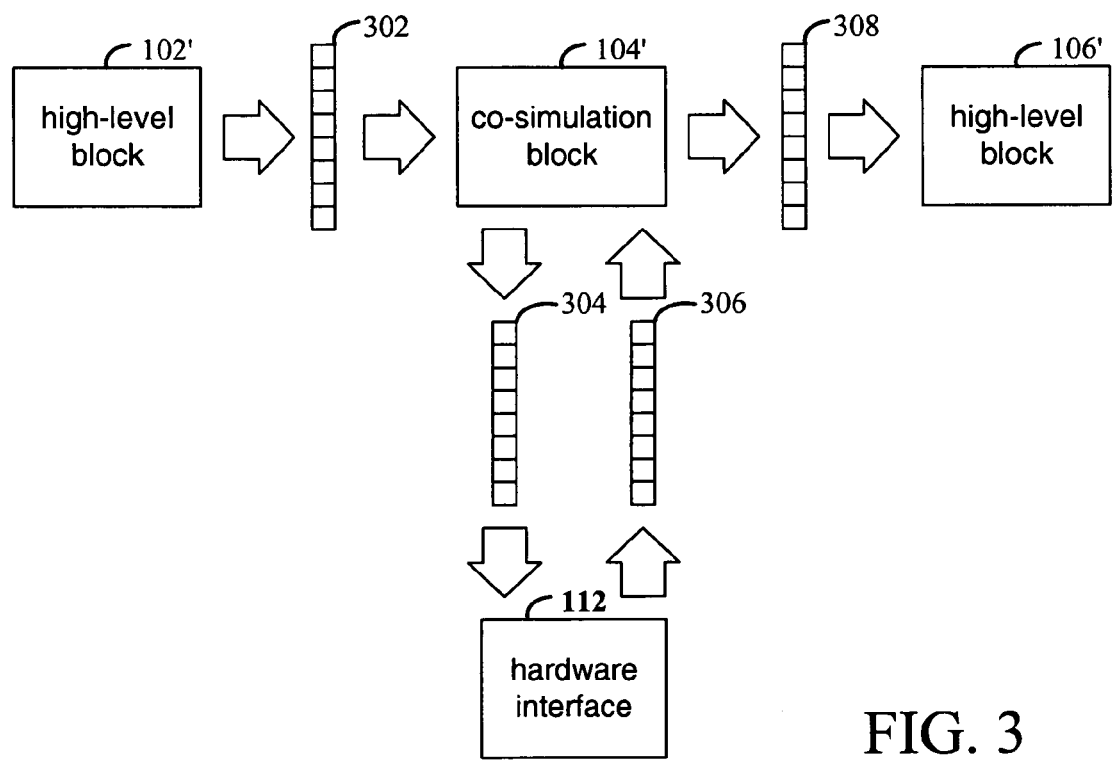
FIG. 3 is a diagram that illustrates frame-based data flow between high-level blocks, a co-simulation block, and a hardware interface.

FIG. 3 is a diagram that illustrates frame-based data flow between high-level blocks, a co-simulation block, and a hardware interface. Some HLMSs, for example, the Simulink system from The Mathworks, support vector type signals between blocks. Instead of passing a scalar data value between blocks, vector type signals may be used to pass frames of data between blocks in a single simulation event. The vector type signal is extended to co-simulation blocks so that they too may operate on vector type signals.

Figure 4:
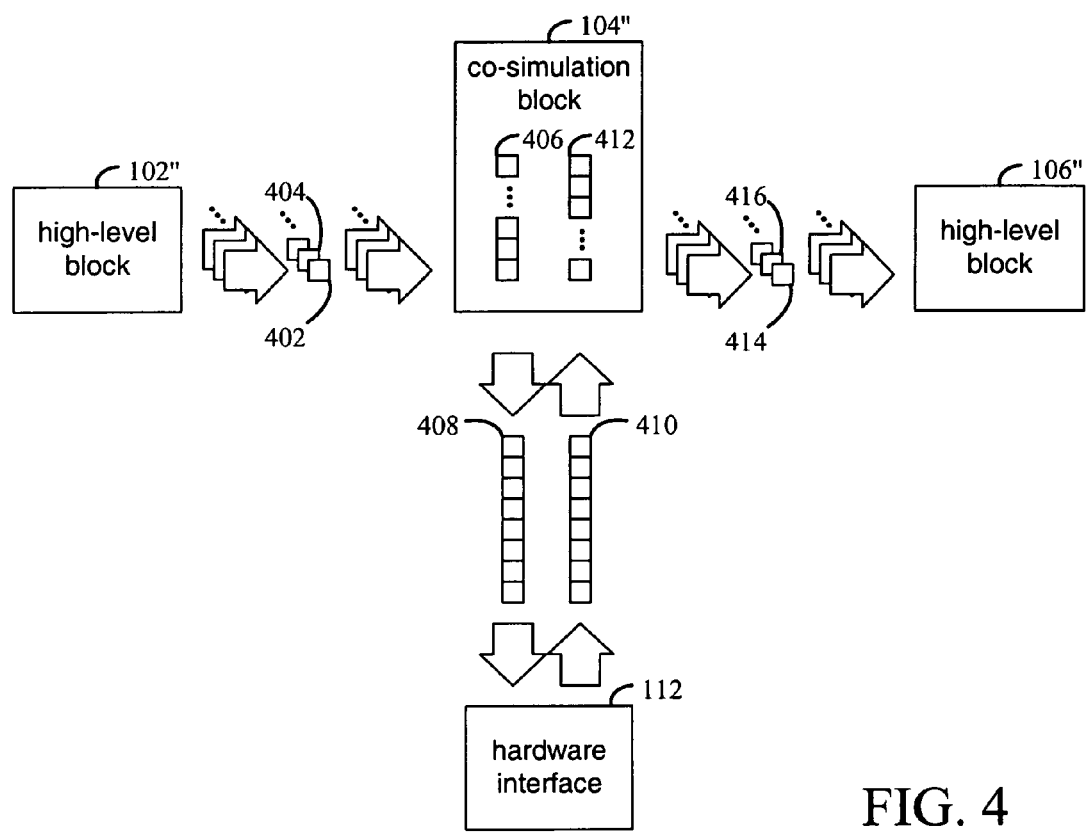
FIG. 4 is a diagram that illustrates buffering and de-buffering of data by a co-simulation block.

FIG. 3 and FIG. 4 illustrate two examples in which a co-simulation block is adapted to interface with the hardware platform with frames of data. In FIG. 3, the co-simulation block 104' receives input frames of data from block 102' and provides output frames of data to block 106'. Frames of data (304 and 306) are transferred between the co-simulation block 104' and hardware interface block 112'. In FIG. 4, the co-simulation block 104" interfaces with the hardware platform 110 with frames of data while receiving scalar input data values and providing scalar data values as output. In both cases, the co-simulation block transfers a frame of data values to the hardware interface with a single invocation of the force function.

An example use case that requires frame-based I/O between the co-simulation block 104' and high-level blocks 102' and 106' is an application in which the high-level blocks are producing frames of data. The performance requirements of the application may require that the co-simulation block be able to process the frames in real-time.

The collection of blocks 302 represents a frame of data ("frame 302") provided by high-level block 102' as input to co-simulation block 104'. Co-simulation block 104' provides frame 304 to interface 112 via a force function, and the interface forwards the frame to the hardware-implemented block 110 (FIG. 1). It will be appreciated that the data values of frame 304 will be identical to the data values of frame 302 since co-simulation block 104' acts as proxy within HLMS 100 for hardware implemented block 110.

A frame of data 306 returned from the hardware-implemented block 110 may be obtained from the interface 112 with the examine function. That same data is provided by co-simulation block 104 as input to high-level block 308. For both forcing a frame of data to and examining a frame of data from the interface, the HLMS requires only a single function call to the interface 112.

FIG. 4 is a diagram that illustrates buffering and de-buffering of data by a co-simulation block. Buffering involves input and output of individual scalar data values to and from the co-simulation block 104'. The co-simulation block accumulates the input scalar data values (received in individual simulation events) in frames for providing the data to the interface 112, and extracts the data values from a frame received from the interface. Frames of data received by the co-simulation block from the hardware interface 112 are debuffered into scalar data values and individually output via individual simulation events.

An example use case involves a scenario in which some additional latency of the HLMS block 104 may be tolerated, and the additional latency does not adversely affect the behavior of the system. The user may desire to increase the throughput of the interface, thereby increasing simulation speed, by reducing the number of hardware transactions that take place during the simulation. Buffering of scalar values may be specified to the HLMS by way of compilation options or parameter values associated with ports or co-simulation blocks, for example.

High-level block 102" provides scalar input data values to co-simulation block 104". The data values provided in sequence to an input port (not shown) of the co-simulation block 104'. For example, block 402 represents a data value ("data value 402") that is input to co-simulation block 104". After data value 402 is input, data value 404 may be input.

Co-simulation block 104" buffers these individual input data values in frame 406. Once the frame is complete (as may be specified by the designer), the frame is sent to interface 112. The collection of blocks 408 represents the data values buffered in frame 406 by co-simulation block 104'.

When co-simulation block 104" receives a frame 410 of data from the interface, the co-simulation block de-buffers the data. The de-buffering is illustrated by data values read from frame 412 and output individually over the same port (not shown). For example, data value 414 is output first followed by data value 416. High-level block 106" receives the de-buffered data values.

Figure 5:
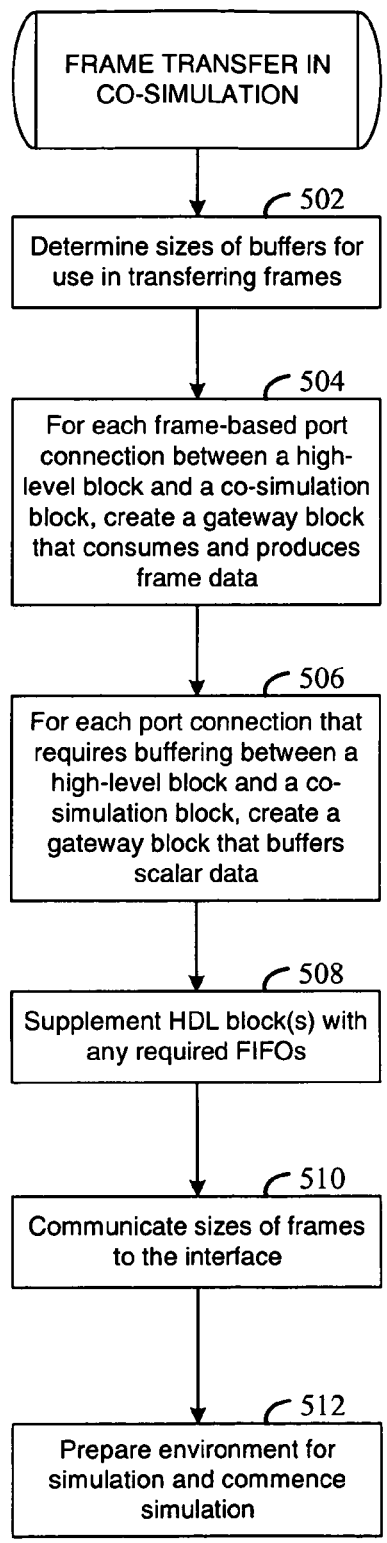
FIG. 5 is a flowchart of an example process for providing transfer of frames between a co-simulation block and a hardware interface during simulation.

FIG. 5 is a flowchart of an example process for providing transfer of frames between a co-simulation block and a hardware interface during simulation. For both of the scenarios of FIGS. 3 and 4, buffers are required in the hardware-implemented block 110 to temporarily store the vector data as it is sent to and received from the interface 112. In order to establish the buffers, suitable sizes for the buffers need to be determined and implemented (step 502).

The required buffer sizes may be determined by way of analyzing the HLMS design when the design is compiled for simulation (including co-simulation). Several example embodiments are described below.

If vector sources and sinks are used in the HLMS design, the buffer sizes are matched to the size of the vectors driving the I/O ports on the co-simulation block. Thus, the parameter values specified for the vectors may be used to determine the buffer sizes.

In another embodiment, the buffer sizes may be determined from a buffer interval value that is defined by the user via a graphical user interface (GUI) in the HLMS. The buffer interval is the amount of time during which a set of scalar values should be buffered to produce a frame. The units in which the buffer interval value may be expressed include units of simulation time, for example, Simulink seconds, or hardware clock cycles. In one embodiment, the buffer interval defines the buffer sizes in hardware for all I/O ports in a design. The GUI may allow the user to specify various options for compiling the design for simulation and co-simulation. Other compilation options provided by the GUI may include an oscillator target frequency, implementation directory, and a processing element.

The buffer sizes may also be specified explicitly with various parameters associated with the I/O ports in the design. For example, the compilation GUI may allow or require the user to specify buffer size to be used for an I/O port of a co-simulation block.

In a final example, the buffer sizes may be determined by estimating the amount of resources that are available for buffers in the device. For example, in an FPGA the block memory resources that are not consumed by the design may be counted. The buffer sizes may be then be defined to use these remaining resources.

The buffer sizes are used by the HLMS to establish data structures used with the interface 112 and hardware structures used between the interface and the hardware-implemented block 110. In one embodiment, frames of data are transferred between the HLMS 100 and the interface 112 using an array of 32-bit integers in combination with a set of functions that operate on the frames. The first integer in the array is used as a header and indicates the width in bits of the vector, whether the data is indeterminate, and whether the values are signed. The array elements that follow the header contain the data bits of the vector.

In hardware, the buffers may be implemented as FIFOs in the device that hosts the hardware-implemented block 110. For example, if the device is a field programmable gate array (FPGA), the FIFOs may be implemented using the device's block memory capabilities. In another embodiment, the FIFOs may be implemented using on-board FIFO devices that are not integrated with the FPGA. In yet another embodiment, the FIFOs may be implemented in the interface 112. For example, the buffers may be implemented in an interface such as the Parallel Cable IV interface from Xilinx, Inc.

Gateway blocks are used in the HLMS 100 to support transfer of data between design blocks. Gateway blocks also define the periphery of the HLMS design. This means that in the HLMS, an input gateway is translated into a top-level input port in hardware, and an output gateway is translated into a top-level output port in hardware. In one embodiment, the gateway blocks may be created to support frame-based data transfers to and from a co-simulation block (steps 504, 506).

Figure 6:
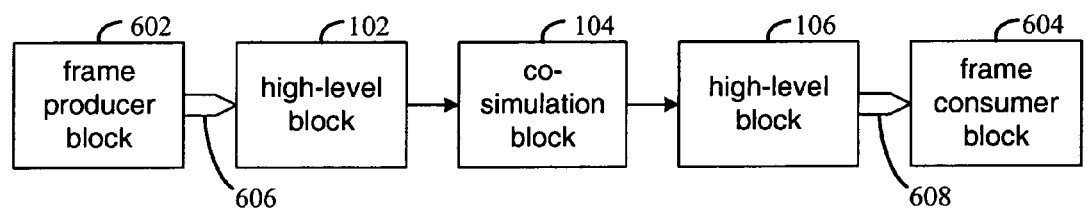
FIG. 6 is a functional block diagram that illustrates gateway blocks that handle transfer of frames and buffering of data between blocks of a design.

FIG. 6 is a functional block diagram that illustrates gateway blocks that handle transfer of frames and buffering of data between blocks of a design. Gateway block 606 handles frames of data sent from frame producer block 602 to high-level block 102, and gateway block 608 handles data sent from high-level block 106 to frame consumer block 604. The capabilities of each of gateway blocks 606 and 608 depend on the design requirements. Specifically, the capabilities may entail converting frames of data received from a frame producer block to vector data compatible with high-level block 102 and converting vector data from high-level block 106 to frames of data compatible with frame consumer block 604. Other instances of gateway blocks may buffer scalar values and de-buffer vector data into vectors and scalar values, respectively.

Frame producer block 602 generates vector data from an input frame of data for further processing by the high-level blocks 102, 104, and 106, and frame consumer block 604 receives input vector data and generates further output data. For example, a producer might be a Simulink block that accepts video frames from an external camera source and converts the frames into vector data that can be expressed in the HLMS. The frame consumer block 604 may be an HLMS block that accepts video data frames and displays the data as real-time video.

It will be appreciated that the HLMS must account for the frame size, sample rate, and buffering of scalar values when synchronizing operations of the high-level blocks and hardware-implemented blocks. Further information describing co-simulation and timing coordination may be found in patent application Ser. No. 10/389,161, entitled, "HDL CO-SIMULATION IN A HIGH-LEVEL MODELING SYSTEM", by Milne et al., filed on Mar. 14, 2003, which is incorporated herein by reference.

An input gateway block may be parameterized with a sample period, $T_s$. For an input scalar value with a sample period, $T_s$, the input gateway block must generate a sequence of scalar values with a sample period of $T_s$/fsize, where fsize is the size of the frame. To accommodate the rate change introduced by frames, the hardware needs to be overclocked. An output gateway gate produces a frame having a sample period $T_s$*fsize, where $T_s$ is the sample period of the scalar input sequence to the gateway.

An input gateway may generate a sequence of scalar values because users may need to simulate a design in software before including a hardware-implemented block and co-simulating. By producing a scalar sequence, the gateway block will allow the same design (including the frame producer and consumer blocks) to be simulated using high-level design blocks (not hardware-implemented) as are used when the hardware-implemented co-simulation block is used.

When the hardware-implemented co-simulation block is created, it subsumes the gateways. The co-simulation block can produce and consume frames directly. Thus, the testbench portion of the HLMS model does not need to change to accommodate the co-simulation block. An output gateway may buffer a sequence of scalar values to produce a frame of a user-specified size for reasons similar to the reasons explained in regards to an input gateway de-buffering a frame of data values.

Returning now to FIG. 5, in compiling the high-level design the HLMS supplements the hardware description language (HDL) blocks with any FIFOs that are used to accommodate the transfer of frames of data (step 508). The HLMS includes a code generator that automatically translates the HLMS design into a hardware description that is typically comprised of HDL and core netlists. Hardware co-simulation implementations have additional hardware included for host workstation-to-FPGA interfacing (e.g., a memory map, clocking logic). In this case, the hardware co-simulation HDL may be further augmented with additional control logic and FIFOs to manage the frame transfers in hardware.

Because the size of the frames is determined by the HLMS and the supporting structures are generated by the HLMS, the HLMS must communicate the frame sizes to the interface 112 (step 510). In one embodiment, the interface and HLMS share a base class, and a method in the base class is invoked by the HLMS to set the size of the buffers.

The simulation may then commence under control of the HLMS (step 512).

Those skilled in the art will appreciate that various alternative computing arrangements would be suitable for hosting the processes of the different embodiments of the present invention. In addition, the processes may be provided via a variety of computer-readable media or delivery channels such as magnetic or optical disks or tapes, electronic storage devices, or as application services over a network.

The present invention is believed to be applicable to a variety of systems for simulating circuit designs and has been found to be particularly applicable and beneficial in co-simulating portions of a design in hardware such as FPGAs. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method for transferring data between blocks in a design during simulation, comprising:
    determining a first buffer size in response to specification of a vector input port of a first high-level block of the design;
    determining a second buffer size in response to specification of a scalar input port of a second high-level block of the design;
    co-simulating a first hardware-implemented block on a hardware co-simulation platform, wherein the first hardware-implemented block implements the first high-level block in the design simulated in a high-level modeling system (HLMS);
    transferring a first vector of data values received by the first high-level block at the vector input port to the first hardware-implemented block via a single call to a first function provided by an interface that couples the HLMS to the first hardware-implemented block;
    wherein the first vector of data values fills the first buffer size;
    co-simulating a second hardware-implemented block on a hardware co-simulation platform, wherein the second hardware-implemented block implements the second high-level block in the design simulated in the HLMS;
    accumulating a plurality of scalar data values received at the scalar input port in a second vector of data values that fills the second buffer size, by the second high-level block; and
    transferring the second vector of data values from the second high-level block to the hardware-implemented block via a single call to the first function of the interface that couples the HLMS to the second hardware-implemented block.

2. The method of claim 1, further comprising:
    simulating operation of a third high-level block in the design; and
    transferring the first vector of data values from the third high-level block to the vector input port of the first high-level block.

3. The method of claim 1, further comprising:
    co-simulating a third hardware-implemented block on a hardware co-simulation platform, wherein the third hardware-implemented block implements a third high-level block in the design simulated in the HLMS; and
    transferring the first vector of data values from the third high-level block to the vector input port of the first high-level block.

4. The method of claim 1, further comprising transferring a third vector of data values received by the interface from the first hardware-implemented block, to the first high-level block in response to a single call to a second function provided by the interface and invoked by the first high-level block.

5. The method of claim 4, further comprising:
    simulating operation of a third high-level block in the design in the HLMS; and
    transferring the third vector of data values from the first high-level block to the third high-level block.

6. The method of claim 4, further comprising:
    co-simulating a third hardware-implemented block on a hardware co-simulation platform, wherein the third hardware-implemented block implements a third high-level block in the design simulated in the HLMS; and
    transferring the third vector of data values from the first high-level block to the third high-level block.

7. The method of claim 4, wherein the hardware co-simulation platform includes a field programmable gate array (FPGA), and the method further comprises:
    establishing a first buffer of the first buffer size and a second buffer of the second buffer size on the FPGA; and
    wherein the transferring the first vector and transferring the second vector include temporarily storing the first vector and the second vector in the first and second buffers.

8. The method of claim 7, wherein the determining the first buffer size comprises determining an associated size of the vector input port, wherein the required size of the buffer is equal to the size of the vector.

9. The method of claim 7, wherein the determining the first buffer size comprises determining the first buffer size as a function of a value of a user-provided configuration parameter.

10. The method of claim 9, wherein the configuration parameter is associated a buffer-size compilation option of the HLMS.

11. The method of claim 7, wherein one or more input/output ports each has an associated configuration parameter value.

12. The method of claim 7, further comprising:
    estimating FPGA resources available for buffers; and
    selecting the first and second buffer sizes as a function of the estimated available resources.

13. The method of claim 1, further comprising:
simulating operation of a third high-level block in the design in a high-level modeling system (HLMS); and
transferring the plurality of scalar values from the third high-level block to the second high-level block.

14. The method of claim 1, further comprising:
co-simulating a third hardware-implemented block on a hardware co-simulation platform, wherein the third hardware-implemented block implements a third high-level block in the design simulated in the HLMS; and
transferring the plurality of scalar values from the third high-level block to the second high-level block.

15. The method of claim 1, further comprising:
simulating operation of a third high-level block in the design in a high-level modeling system (HLMS); and
outputting a sequence of scalar values from a vector of data received by the second high-level block from the first hardware-implemented block to the third high-level block.

16. The method of claim 1, further comprising:
co-simulating a third hardware-implemented block on a hardware co-simulation platform, wherein the third hardware-implemented block implements a third high-level block in the design; and
outputting a sequence of scalar values from a vector of data received by the second high-level block to the third high-level block.

17. An apparatus for transferring data between blocks in a design during simulation, comprising:
means for determining a first buffer size in response to specification of a vector input port of a first high-level block of the design;
means for determining a second buffer size in response to specification of a scalar input port of a second high-level block of the design;
means for co-simulating a first hardware-implemented block on a hardware co-simulation platform, wherein the first hardware-implemented block implements the first high-level block in the design simulated in a high-level modeling system (HLMS);
means for transferring a first frame of data received by the first high-level block at the vector input port to the first hardware-implemented block via a single call to a first function provided by an interface that couples the HLMS to the first hardware-implemented block;
wherein the first vector of data values fills the first buffer size;
means for co-simulating a second hardware-implemented block on a hardware co-simulation platform, wherein the second hardware-implemented block implements the second high-level block in the design simulated in the HLMS;
means for accumulating a plurality of scalar data values received at the scalar input port in a second vector of data values that fills the second buffer size, by the second high-level block; and
means for transferring the second vector of data values from the second high-level block to the hardware-implemented block via a single call to the first function of the interface that couples the HLMS to the second hardware-implemented block.

* * * * *